US007714585B2

United States Patent
Nikitenko et al.

(10) Patent No.: US 7,714,585 B2
(45) Date of Patent: May 11, 2010

(54) MULTI-FREQUENCY CANCELLATION OF DIELECTRIC EFFECT

(75) Inventors: Marina N. Nikitenko, Novosibirsk (RU); Leonty A. Tabarovsky, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 434 days.

(21) Appl. No.: 11/689,118

(22) Filed: Mar. 21, 2007

(65) Prior Publication Data

US 2008/0231283 A1 Sep. 25, 2008

(51) Int. Cl.
*G01V 3/00* (2006.01)
(52) U.S. Cl. .................... 324/338; 324/335
(58) Field of Classification Search ............ None
See application file for complete search history.

(56) References Cited

U.S. PATENT DOCUMENTS

| | | | | |
|---|---|---|---|---|
| 4,837,517 | A | 6/1989 | Barber | 324/339 |
| 5,157,605 | A | 10/1992 | Chandler et al. | 364/422 |
| 5,187,661 | A | 2/1993 | Sinclair | |
| 5,345,179 | A | 9/1994 | Habashy et al. | 324/338 |
| 5,367,262 | A | 11/1994 | Manning | 324/341 |
| 5,452,761 | A | 9/1995 | Beard et al. | 166/250 |
| 5,663,499 | A | 9/1997 | Semmelbeck et al. | |
| 5,703,773 | A | 12/1997 | Tabarovsky et al. | |
| 5,884,227 | A * | 3/1999 | Rabinovich et al. | 702/7 |
| 6,092,024 | A | 7/2000 | Wu | 702/7 |
| 6,777,940 | B2 | 8/2004 | Macune et al. | |
| 6,892,137 | B2 | 5/2005 | Haugland | 702/7 |
| 7,031,839 | B2 | 4/2006 | Tabarovsky et al. | |
| 7,333,891 | B2 * | 2/2008 | Rabinovich et al. | 702/7 |
| 2002/0101242 | A1 | 8/2002 | Bittar | 324/338 |
| 2002/0173913 | A1 | 11/2002 | Tabarovsky et al. | 702/7 |
| 2003/0004647 | A1 | 1/2003 | Sinclair | 702/7 |
| 2003/0129763 | A1 | 7/2003 | Chamberlain et al. | 436/149 |
| 2003/0137301 | A1 | 7/2003 | Thompson et al. | 324/338 |
| 2003/0155925 | A1 * | 8/2003 | Tabarovsky et al. | 324/374 |
| 2004/0090234 | A1 | 5/2004 | Macune | 324/337 |
| 2004/0113609 | A1 * | 6/2004 | Homan et al. | 324/202 |
| 2004/0140811 | A1 | 7/2004 | Conti | 324/338 |
| 2004/0145370 | A1 | 7/2004 | Conti | 324/339 |
| 2004/0178797 | A1 | 9/2004 | Rioufol et al. | 324/367 |
| 2004/0196046 | A1 | 10/2004 | Aidan et al. | 324/339 |
| 2004/0220741 | A1 | 11/2004 | Haugland | 702/7 |
| 2004/0239329 | A1 | 12/2004 | Haber et al. | 324/339 |
| 2005/0189945 | A1 | 9/2005 | Reiderman | 324/333 |
| 2006/0155471 | A1 | 7/2006 | Tabarovsky et al. | |

(Continued)

FOREIGN PATENT DOCUMENTS

SU 840781 6/1981

OTHER PUBLICATIONS

L.A. Tabarovsky et al.; "Combination of geometric and frequency focusing in dielectric induction well logging," Siberian Division Acad. Sci. USSR, 1979, pp. 1-48.

*Primary Examiner*—Patrick J Assouad
*Assistant Examiner*—David M. Schindler
(74) *Attorney, Agent, or Firm*—Mossman Kumar & Tyler PC

(57) ABSTRACT

Measurements made with an induction logging tool are responsive to formation conductivity and permittivity. The effect of permittivity can be substantially removed by multi-frequency focusing.

16 Claims, 3 Drawing Sheets

U.S. PATENT DOCUMENTS

2006/0208737 A1 9/2006 Merchant et al. ............ 324/330
2007/0061083 A1* 3/2007 Habashy et al. ............... 702/11
2007/0137854 A1 6/2007 Homan et al. ................. 166/66

* cited by examiner

MULTI-FREQUENCY CANCELLATION OF DIELECTRIC EFFECT

BACKGROUND OF THE INVENTION

1. Field of the Invention

The invention is related generally to the field of acquisition and interpretation of measurements made by well logging instruments for the purpose of determining the properties of earth formations. More specifically, the invention is related to a method for correction of dielectric effects using multifrequency resistivity data.

2. Background of the Art

Electromagnetic induction and wave propagation logging tools are commonly used for determination of electrical properties of formations surrounding a borehole. These logging tools give measurements of apparent resistivity (or conductivity) of the formation that when properly interpreted are diagnostic of the petrophysical properties of the formation and the fluids therein.

The physical principles of electromagnetic induction resistivity well logging are described, for example, in, H. G. Doll, Introduction to Induction Logging and Application to Logging of Wells Drilled with Oil Based Mud, Journal of Petroleum Technology, vol. 1, p. 148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. No. 4,837,517; U.S. Pat. No. 5,157,605 issued to Chandler et al, and U.S. Pat. No. 5,452,761 issued to Beard et al.

It has long been known that resistivity measurements made by a logging tool are responsive not only to formation resistivity (or conductivity), but also to the dielectric properties of the formation. See, for example, U.S. Pat. No. 5,187,661 to Sinclair, U.S. Pat. No. 5,367,262 to Manning, U.S. Pat. No. 5,345,179 to Habashy et al., U.S. Pat. No. 5,811,873 two Meyer Jr., U.S. Pat. No. 6,092,024 to Wu, and U.S. Pat. No. 6,892,137 to Hoaglund.

Some of the prior art methods address the problem of resistivity determination using model-based relations between the resistivity and a dielectric constant. The present invention addresses the problem of resistivity determination without using such models.

SUMMARY OF THE INVENTION

One embodiment of the disclosure is a method of determining a resistivity of an earth formation. The method includes conveying into a borehole in the earth formation a resistivity measuring instrument having at least one transmitter and at least one receiver spaced apart from the at least one transmitter. The at least one transmitter is activated at a plurality of frequencies resulting in induction of signals in the at least one receiver, the induced signals being indicative of the resistivity and a permittivity of the earth formation. A multifrequency focusing is applied to the induced signals to give a focused signal indicative of the resistivity, coefficients of the multi-frequency focusing being selected to substantially eliminate an effect of the permittivity on the focused signal. Using signals at the at least one receiver may further include using signals at a main receiver and a second receiver. The resistivity measuring instrument may be conveyed into the borehole on a wireline, a slickline and/or a drilling tubular. The method may further include performing an operation that may include displaying the formation resistivity, storing the formation resistivity on a suitable medium, interpreting a petrophysical property of the formation, performing a geological correlation, determining a hydrocarbon-water contact, determining an invasion profile, identifying a fracture, estimating movable hydrocarbons, controlling a direction of drilling, and/or drilling an additional well.

Another embodiment of the disclosure is an apparatus configured for determining a resistivity of an earth formation. The apparatus includes a resistivity measuring instrument configured to be conveyed into a borehole in the earth formation, the resistivity measuring instrument having at least one transmitter and at least one receiver spaced apart from the at least one transmitter. The at least one transmitter is configured to operate at a plurality of frequencies and the at least one receiver is configured to produce induced signals indicative of the resistivity and a permittivity of the earth formation. The apparatus further includes a processor configured to apply a multifrequency focusing to the induced signals to give a focused signal from which the resistivity is determined by using coefficients of the multifrequency focusing selected to substantially eliminate an effect of the permittivity on the focused signal. The at least one receiver may include a main receiver and a second receiver. The apparatus may further include a conveyance device configured to convey the resistivity instrument into the borehole, the conveyance device being selected from a wireline, a slickline, or a drilling tubular. The apparatus may further include a processor configured to perform at least one of: (i) display the formation resistivity, (ii) store the formation resistivity on a suitable medium, (iii) interpret a petrophysical property of the formation, (iv) perform a geological relation, (v) determine a hydrocarbon-water contact, (vi) determine an invasion profile, (vii) identify a fracture, (viii) estimate movable hydrocarbons, (ix) control a direction of drilling of the borehole, and (x) drill an additional well.

Another embodiment is a computer readable medium for use with an apparatus for determining a resistivity of an earth formation. The apparatus includes a resistivity measuring instrument configured to be conveyed into a borehole in the earth formation. The resistivity instrument has a transmitter and a receiver spaced apart from the transmitter. The transmitter is configured to operate at a plurality of frequencies and the receiver is configured to produce induced signals indicative of the resistivity and a permittivity of the earth formation. The medium includes instructions which enable a processor to apply a multifrequency focusing to the induced signals to give a focused signal, select coefficients of the multifrequency focusing to substantially eliminate an effect of the permittivity on the focused signal, and determined from the focused signal the formation resistivity. The medium may include a read-only memory (ROM), a programmable read-only memory (PROM), an electrically programmable read-only memory (EPROM), an electrically alterable read-only memory (EAROM), an electrically erasable and programmable read-only memory (EEPROM), a flash memory, an optical disk, a hard drive, an iPod®, and/or a non-volatile read-write memory (NOVRAM).

BRIEF DESCRIPTION OF THE FIGURES

The present invention is best understood with reference to the accompanying figures in which like numerals referred to like elements and in which.

DETAILED DESCRIPTION OF THE INVENTION

Figure 1:
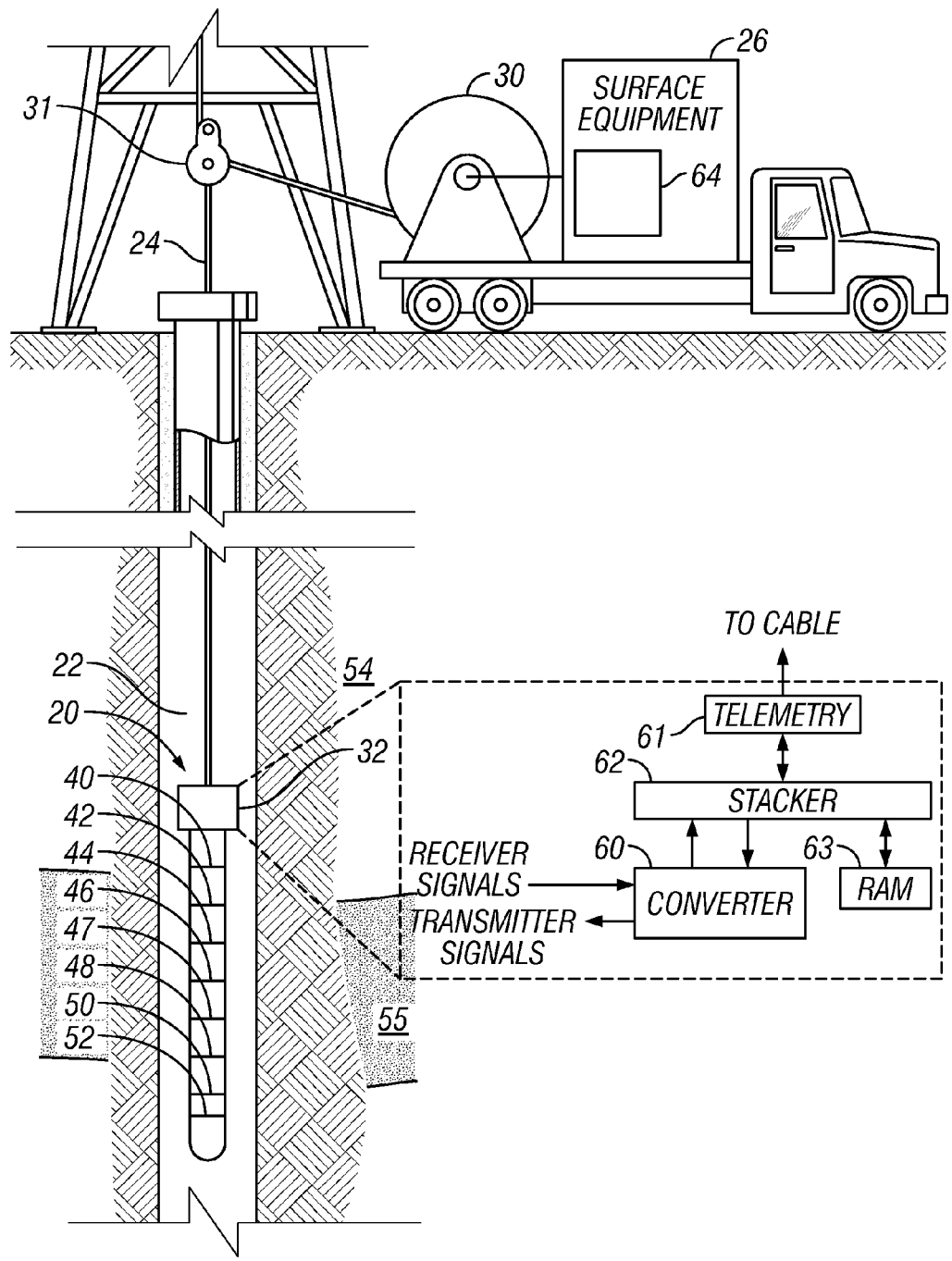
FIG. 1 (prior art) shows an induction instrument disposed in a wellbore penetrating an earth formation.

Referring now to FIG. 1, an induction logging tool 20 suitable for use with the present invention is shown positioned in a borehole 22 penetrating earth formations 54. The tool 20, which is suspended in the borehole 22 by means of a wireline cable 24, includes a borehole sonde 34 and an electronic circuitry section 32. The tool 20 is lowered into the borehole 22 by a cable 24, which passes over a sheave 31 located at the surface of the borehole 22. The cable 24 is typically spooled onto a drum 30. The cable 24 includes insulated electric conductors for transmitting electrical signals. The electronic circuitry section 32 of the tool 20 receives signals from the sonde section b to perform various analog and digital functions, as will be described later.

The sonde 34 may include a plurality of coils 40-52. Coil 46 is a transmitter coil for transmitting an oscillating signal into the adjacent surrounding geological formation 54. It is contemplated that any of a number of oscillating voltage signals having multiple frequency components can be used. Further, it is desirable that, on occasion, a single-frequency signal, such as a sinusoidal signal, is used. The oscillating voltage signal applied to the coil 46 generates a current in coil 46 which in turn generates an electromagnetic field in the surrounding formation 54. The electromagnetic field, in turn, induces eddy currents, which flow coaxially with respect to the borehole 22. The magnitudes of the eddy currents are related to the conductivity of the surrounding formation 54. The remaining coils 40, 42, 44, 47, 48, 50 and 52 are receiver coils in which signals are induced by the electric fields caused by the eddy currents produced in the formation. As the tool 20 is raised in the borehole 22, the conductivity of the surrounding formation 54 can be determined from the received signals in order that a bed or layer 55 having a conductivity that is indicative of the possibility of containing hydrocarbons may be located. The number of receiver coils shown is for illustrative purposes only; more or fewer coils may be used.

The electronic circuitry section 32 may include a converter circuit 60, a stacker circuit 62, a random access memory (RAM) 63, and a telemetry circuit 61. The converter circuit 60 comprises a plurality of pre-amplifiers, filters, and analog-to-digital (A/D) converters for receiving signals from the receiver coils 40-52 and transforming them into digitized signals for further processing by the stacker circuit 62. The analog voltage signals provided by the receiver coils 40-52 are digitally sampled according to a predetermined sampling rate in the period defined by the fundamental frequency of the transmitter signal, which in a typical embodiment is approximately 10 kHz.

The sampling may be repeated over a large number of transmitter voltage signal cycles, preferably at least 1,024 cycles to improve the signal-to-noise ratio of the received signals. To reduce the amount of data that must be stored or transmitted, corresponding digital samples taken in each of the transmitter cycles are summed. The summed digital signal samples corresponding to each of the plurality of receiver coils form corresponding stacked signal samples, which are stored in the RAM 63. The stacked signals corresponding to the plurality of receiver coils 40-52 can then be retrieved from the RAM 63 and can be transmitted by the telemetry circuit 61 through the cable 24 to a processor 64 which forms part of the surface equipment 26, where analyses of the stacked signals can be performed. Alternatively, processing of at least part of the data could be performed downhole using a processor at a suitable location (not shown) and results of the processing telemetered uphole.

In an alternative embodiment, a processor having sufficient digital signal processing capabilities could form part of the electronic circuitry section 32. Thus, it is contemplated that the required discrete Fourier transform could be performed downhole, which would further reduce the amount of data to be transmitted to the surface.

Figure 2:
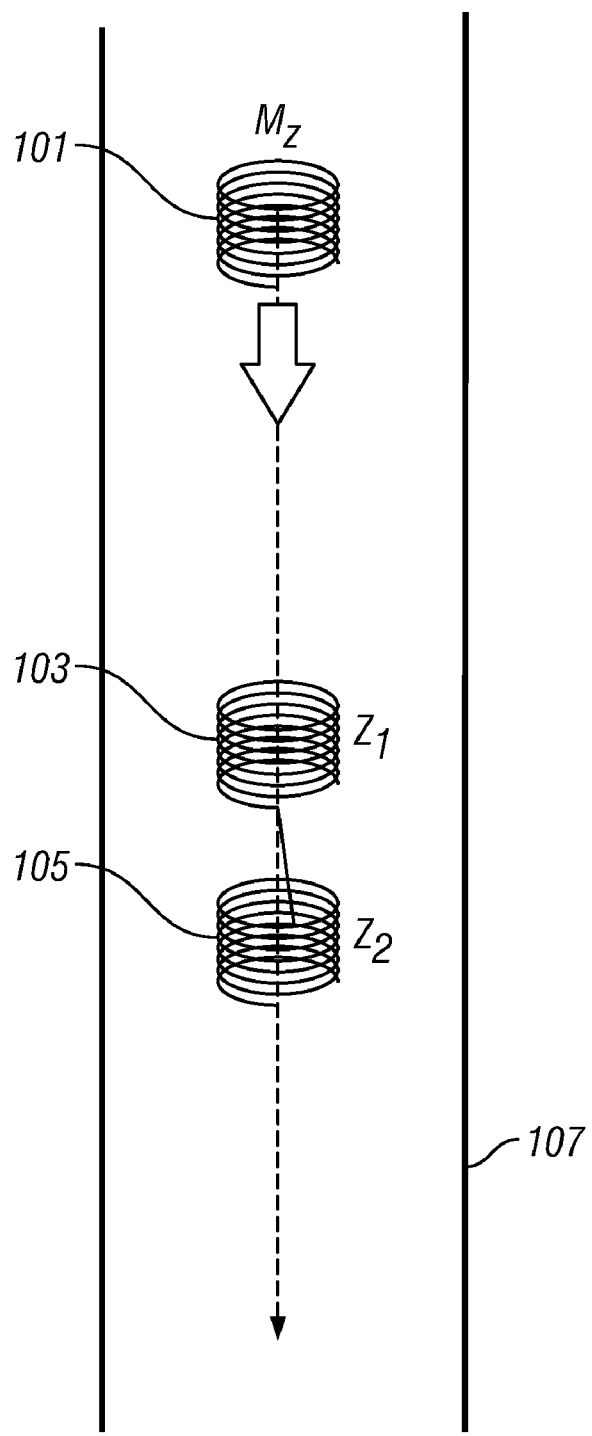
FIG. 2 (prior art) shows the arrangement of transmitter and receiver coils in an embodiment of the present disclosure.

Turning now to FIG. 2, a suitable configuration of transmitter and receiver coils is illustrated. The logging tool (not shown) in a borehole 107 includes a transmitter coil 101, a main receiver coil 103, and a bucking coil 105. The use of bucking coils is known in the art is not discussed further.

For the transmitter-receiver configuration of FIG. 2, the induced signal with the tool in a homogeneous formation may be represented by a Taylor series expansion:

$$H = \sum_{k=1}^{\infty} a_k \cdot f^{\frac{k+1}{2}}, \tag{1}$$

where H is the induced signal, f is the frequency and $a_k$ are coefficients of expansion. Such a series expansion is discussed in U.S. Pat. No. 5,884,227 to Rabinovich et al., having the same assignee as the present disclosure and the contents of which are incorporated herein by reference. The induced signal is a complex quantity. The coefficients $a_1$ and $a_2$ do not depend on the permittivity $\in$.

For relatively small frequencies and/or high conductivities the coefficients from $a_3$ and higher contain 1st power of $\in$. The coefficients from $a_6$ and higher also contain higher powers of $\in$. For the signal $M_z H_z$ for example, the term in the expansion given by equation (1) corresponding to the $1^{st}$ power of $\in$ is the following $$\frac{\mu \cdot \pi \cdot f^2}{L} \left\{ (1-d^2) + L \cdot (1-d^3) \cdot c^{\frac{1}{2}} f^{\frac{1}{2}} + L^2 \cdot (1-d^4) \cdot \frac{cf}{2!} + \right. \tag{2}$$
$$\left. L^3 \cdot (1-d^5) \cdot \frac{c^{\frac{3}{2}} f^{\frac{3}{2}}}{3!} + L^4 \cdot (1-d^6) \cdot \frac{c^2 f^2}{4!} + \dots \right\}.$$

In equation (2), L is the distance from the transmitter to main receiver d is the ratio of the smaller to the larger length in the 3-coil array; and $c = -2\pi i \mu \sigma$, where $\mu$ is the permeability and $\sigma$ is the conductivity.

To reduce the effect of formation permittivity, we consider the frequency transformation:

$$H_f = \sum_{j=1}^{N} M_j \cdot H(f_j), \tag{3}$$

In the method of the present disclosure, the moments $M_j$ are chosen to delete N−1 components in the series given by equation (2) corresponding to $$f^2, f^{\frac{5}{2}}, f^3, \ldots.$$

The system of the equations to determine the moments is given by:

$$\begin{bmatrix} 1 & 1 & 1 & \ldots & 1 \\ \left(\frac{f_2}{f_1}\right)^{\frac{1}{2}} & \left(\frac{f_3}{f_1}\right)^{\frac{1}{2}} & \left(\frac{f_4}{f_1}\right)^{\frac{1}{2}} & \ldots & \left(\frac{f_N}{f_1}\right)^{\frac{1}{2}} \\ \frac{f_2}{f_1} & \frac{f_3}{f_1} & \frac{f_4}{f_1} & \ldots & \frac{f_N}{f_1} \\ \ldots & \ldots & \ldots & \ldots & \ldots \\ \left(\frac{f_2}{f_1}\right)^{\frac{N-3}{2}} & \left(\frac{f_3}{f_1}\right)^{\frac{N-3}{2}} & \left(\frac{f_4}{f_1}\right)^{\frac{N-3}{2}} & \ldots & \left(\frac{f_N}{f_1}\right)^{\frac{N-3}{2}} \end{bmatrix} \begin{bmatrix} M_2' \\ M_3' \\ M_4' \\ \ldots \\ M_N' \end{bmatrix} = -\begin{bmatrix} 1 \\ 1 \\ 1 \\ \ldots \\ 1 \end{bmatrix}. \quad (4)$$

Where $$M_i = \frac{f_1^2}{f_i^2} M_i', \; M_1' = 1. \quad (5)$$

It is worth noting that the coefficients M depend only on the frequencies and not on the tool geometry.

Figure 3:
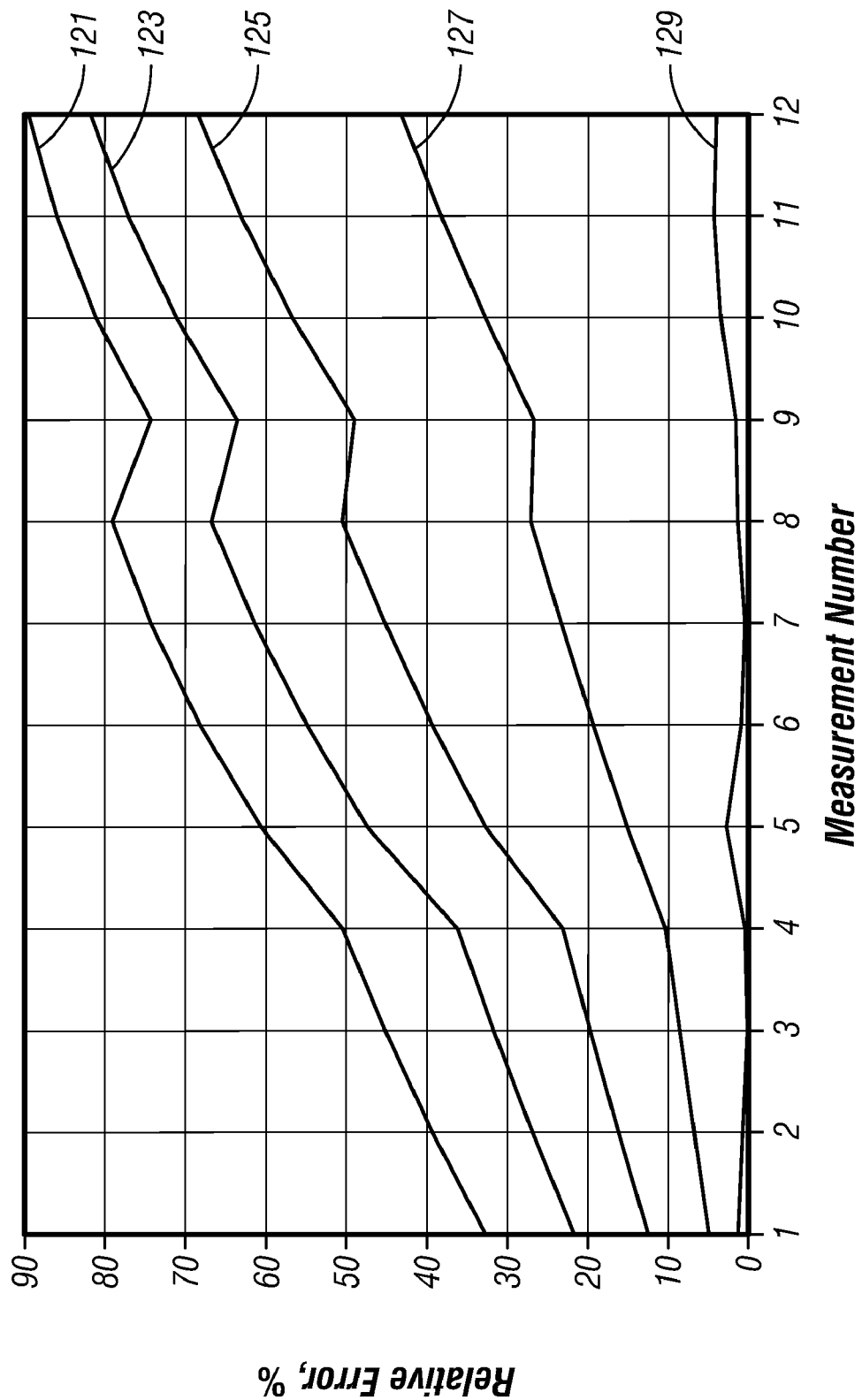
FIG. 3 shows simulation results for exemplary coil configurations and exemplary frequencies of the method of the present invention.

Turning now to FIG. 3, simulation results are shown. The medium in FIG. 2 is homogeneous with a resistivity of 20 Ω-m and a relative permittivity of 80. Simulations were carried out for four different values of L: 0.25 m, 0.5 m, 0.75 m and 1.0 m, while the d was 0.8. In FIG. 3, measurement numbers 1, 5 and 9 correspond to a value of L of 0.25 m, measurement numbers 2, 6 and 10 correspond to a value of L of 0.5 m, measurement numbers 3, 7 and 11 correspond to a value of L of 0.75 m, and measurement numbers 4, 8 and 12 correspond to a value of L of 1.0 m. Thus, within each group of four, the transmitter-receiver distance increases.

For the first group of four measurements (measurement numbers 1-4), the frequencies used were {2.8 MHz, 5 MHz, 7 MHz and 10 Mz}, corresponding to curves 127, 125, 123 and 121 respectively. Plotted in FIG. 3 is the relative difference between the simulated signal for ∈*=80 and for ∈*=0. The curve 129 is the corresponding curve for multi-frequency focusing (MFF) using equation (3).

The second group of four measurements (measurement numbers 5-8), the frequencies used were {5.6 MHz, 10 MHz, 14 MHz and 20 Mz}. Curves 127, 125, 123 and 121 are, as before, the relative difference between the simulated signal for ∈*=80 and for ∈*=0 while curve 129 is the corresponding curve for multi-frequency focusing (MFF). Finally, the third group of four measurements (measurement numbers 9-12) were for frequencies of {8.4 MHz, 15 MHz, 21 MHz and 30 MHz}.

Several points may be noted with respect to FIG. 3. It can be clearly seen that the MFF reduces the effect of the formation permittivity: the curve 129 (the result of multifrequency focusing) consistently has a much smaller value than the measurements at the individual frequencies. A second point to be noted is that within each group of four, the lower the frequency the smaller the error. This is to be intuitively expected since at zero frequency, the error should be zero and, the purpose of the MFF is to extrapolate the signals to zero frequency. It can also be seen that the second group has larger errors than the first group and the third group has larger errors than the second group. This, again, is a result of the increase in frequencies from group 1 to group 2 to group 3.

For the particular choice of frequencies used in the simulation, it should be noted that the values of the moments are:

$M_1=1$. $M_2=-1.18$, $M_3=0.617$ and $M_4=0.093$.

One embodiment of the invention selects the frequencies for the MFF using the method disclosed in U.S. Pat. No. 7,031,839 to Tabarovsky et al. having the same assignee as the present disclosure and the contents of which are incorporated herein by reference. The basic principle discussed in Tabarovsky is to select frequencies in such a manner as to increase the linear independence of the columns of the Taylor series matrix. In addition, the method also includes selecting the transmitter-receiver distances based on performing simulation results such as that shown about so as to give errors that fall below a specified threshold.

The present invention has been discussed above with respect to measurements made by an induction logging tool conveyed on a wireline. This is not intended to be a limitation and the method is equally applicable to measurements made using a comparable tool conveyed on a measurement-while-drilling (MWD) assembly or on coiled tubing. When MWD measurements are made using sensors on a housing having a finite, nonzero conductivity, the Taylor series expansion has terms that are different from that discussed above for wireline applications where the mandrel may be considered to have zero conductivity. The Taylor series expansion for such a case is discussed in Tabarovsky and may be used with the method of the present invention.

It should further be noted that the about discussion made references to resistivity and conductivity, the reciprocal of resistivity. For the purposes of this invention, determination of resistivity is to be construed as completely equivalent to the determination of conductivity. It should further be noted that the invention has been discussed with reference to a logging tool which has a transmitter and receivers coaxial with the axis of the logging tool. This is not to be construed as a limitation of the invention as the method of multifrequency focusing may also be used with devices in which the transmitter and all receiver axes are inclined to the tool axis.

Once the formation resistivity has been determined, values of the determined resistivity may be displayed as a log and/or stored on a suitable medium. Those versed in the art would recognize that knowledge of formation resistivity is of great utility in the evaluation and development of hydrocarbon reservoirs. Specifically, accurate resistivity measurements may be used to interpret petrophysical quantities such as water saturation and sand content. Further applications include geologic correlation, determination of hydrocarbon/water contact, invasion profile definition, fracture identification and estimation of moveable hydrocarbons. Thus, with the knowledge of resistivity, decisions can be made about additional evaluation wells to be drilled and location and number of development wells.

When measurements are made while drilling, resistivity measurements may be used to control the direction of drilling. Specifically, a well may be drilled to stay at a specified instance from an interface in the earth formation such as an oil-water contact, a caprock, a shale lens and/or a gas-oil contact.

Implicit in the acquisition and processing the data is the use of a processor. The term processor is intended to include such devices as a field processing gate array (FPGA). The processor may carry out instructions stored on a computer-readable medium such as a read-only memory (ROM), a programmable read-only memory (PROM), an electrically programmable read-only memory (EPROM), an electrically alterable read-only memory (EAROM), an electrically erasable and programmable read-only memory (EEPROM), a flash memory, an optical disk, a hard drive, an IPOD®, and/or a non-volatile read-write memory (NOVRAM).

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining a resistivity of an earth formation, the method comprising:
   (a) conveying into a borehole in the earth formation a resistivity measuring instrument having at least one transmitter and at least one receiver spaced apart from the at least one transmitter;
   (b) activating the at least one transmitter at a plurality of frequencies and inducing signals in the at least one receiver, the induced signals indicative of the resistivity and a permittivity of the earth formation; and
   (c) applying a multifrequency focusing (MFF) to the induced signals by forming a weighted summation thereof to give a focused signal from which the resistivity is determined;
   wherein coefficients of the MFF are selected to substantially eliminate an effect of the permittivity on the focused signal.

2. The method of claim 1 wherein forming the weighted summation further comprises using a relation of the form $$H_f = \sum_{j=1}^{N} M_j \cdot H(f_j)$$

where $H(f_j)$ refers to the magnetic field at the j-th frequency and $M_j$ are coefficients selected using a relationship of the form:

$$\begin{bmatrix} 1 & 1 & 1 & \cdots & 1 \\ \left(\frac{f_2}{f_1}\right)^{\frac{1}{2}} & \left(\frac{f_3}{f_1}\right)^{\frac{1}{2}} & \left(\frac{f_4}{f_1}\right)^{\frac{1}{2}} & \cdots & \left(\frac{f_N}{f_1}\right)^{\frac{1}{2}} \\ \frac{f_2}{f_1} & \frac{f_3}{f_1} & \frac{f_4}{f_1} & \cdots & \frac{f_N}{f_1} \\ \cdots & \cdots & \cdots & \cdots & \cdots \\ \left(\frac{f_2}{f_1}\right)^{\frac{N-3}{2}} & \left(\frac{f_3}{f_1}\right)^{\frac{N-3}{2}} & \left(\frac{f_4}{f_1}\right)^{\frac{N-3}{2}} & \cdots & \left(\frac{f_N}{f_1}\right)^{\frac{N-3}{2}} \end{bmatrix} \begin{bmatrix} M'_2 \\ M'_3 \\ M'_4 \\ \cdots \\ M'_N \end{bmatrix} = - \begin{bmatrix} 1 \\ 1 \\ 1 \\ \cdots \\ 1 \end{bmatrix}$$

wherein $$M_i = \frac{f_1^2}{f_i^2} M'_i,$$

$M_1'$ here $M_i$ s are the coefficients and the f's are frequencies.

3. The method of claim 2 wherein using signals at the at least one receiver further comprises using signals at a main receiver and a second receiver wherein the at least one transmitter, the main receiver and the second receiver define a three-coil array.

4. The method of claim 3 further comprising using a relationship of the form:

$$\frac{\mu \cdot \pi \cdot f^2}{L} \left\{ (1-d^2) + L \cdot (1-d^3) \cdot c^{\frac{1}{2}} f^{\frac{1}{2}} + L^2 \cdot (1-d^4) \cdot \frac{cf}{2!} + \right.$$
$$\left. L^3 \cdot (1-d^5) \cdot \frac{c^{\frac{3}{2}} f^{\frac{3}{2}}}{3!} + L^4 \cdot (1-d^6) \cdot \frac{c^2 f^2}{4!} + \cdots \right\}$$

where μ is a permeability, L is a distance between the at least one transmitter transmitter and the main receiver, f is a frequency, d is a ratio of a smaller length to a larger length of the three coil array, and c=−2πiμσ, where μ is a permeability and σ is a conductivity.

5. The method of claim 1 further comprising conveying the resistivity instrument into the borehole on one of: (i) a wireline, (ii) a slickline, and (iii) a drilling tubular.

6. The method of claim 1 further comprising using the determined resistivity for performing an operation that is at least one of (i) displaying the formation resistivity, (ii) storing the formation resistivity on a suitable medium, (iii) interpreting a petrophysical property of the formation, (iv) performing a geological correlation, (v) determining a hydrocarbon-water contact, (vi) determining an invasion profile, (vii) identifying a fracture, (viii) estimating movable hydrocarbons, (ix) controlling a directional drilling of the borehole, and (x) drilling an additional well.

7. That method of claim 1 further comprising selecting values of the plurality of frequencies to increase linear independence of columns of a Taylor series matrix.

8. An apparatus configured for determining a resistivity of an earth formation, the apparatus comprising:
   a resistivity measuring instrument configured to be conveyed into a borehole in the earth formation, the resistivity instrument having at least one transmitter and at least one receiver spaced apart from the at least one transmitter, the at least one transmitter configured to operate at a plurality of frequencies, the at least one receiver configured to produce induced signals indicative of the resistivity and a permittivity of the earth formation; and
   a processor configured to apply a multifrequency focusing (MFF) to the induced signals by forming a weighted summation thereof to give a focused signal from which the resistivity is determined using coefficients of the MFF selected to substantially eliminate an effect of the permittivity on the focused signal.

9. The apparatus of claim 8 wherein the processor is further configured to form the weighted summation by using a relation of the form:

$$H_f = \sum_{j=1}^{N} M_j \cdot H(f_j)$$

where $H(f_j)$ refers to the magnetic field at the j-th frequency and $M_j$ are coefficients selected using a relationship of the form:

$$\begin{bmatrix} 1 & 1 & 1 & \cdots & 1 \\ \left(\frac{f_2}{f_1}\right)^{\frac{1}{2}} & \left(\frac{f_3}{f_1}\right)^{\frac{1}{2}} & \left(\frac{f_4}{f_1}\right)^{\frac{1}{2}} & \cdots & \left(\frac{f_N}{f_1}\right)^{\frac{1}{2}} \\ \frac{f_2}{f_1} & \frac{f_3}{f_1} & \frac{f_4}{f_1} & \cdots & \frac{f_N}{f_1} \\ \cdots & \cdots & \cdots & \cdots & \cdots \\ \left(\frac{f_2}{f_1}\right)^{\frac{N-3}{2}} & \left(\frac{f_3}{f_1}\right)^{\frac{N-3}{2}} & \left(\frac{f_4}{f_1}\right)^{\frac{N-3}{2}} & \cdots & \left(\frac{f_N}{f_1}\right)^{\frac{N-3}{2}} \end{bmatrix} \begin{bmatrix} M'_2 \\ M'_3 \\ M'_4 \\ \cdots \\ M'_N \end{bmatrix} = -\begin{bmatrix} 1 \\ 1 \\ 1 \\ \cdots \\ 1 \end{bmatrix}$$

wherein $$M_i = \frac{f_1^2}{f_i^2} M'_i,$$

$M_1'$ here $M_i$ s are the coefficients and the f's are frequencies.

10. The apparatus of claim 9 wherein the at least one receiver further comprises a main receiver and a second receiver,
wherein the at least one transmitter, the main receiver and the second receiver defining a three-coil array.

11. The apparatus of claim 10 wherein the processor is further configured to use a relationship of the form $$\frac{\mu \cdot \pi \cdot f^2}{L} \left\{ (1-d^2) + L \cdot (1-d^3) \cdot c^{\frac{1}{2}} f^{\frac{1}{2}} + L^2 \cdot (1-d^4) \cdot \frac{cf}{2!} + \right.$$

$$\left. L^3 \cdot (1-d^5) \cdot \frac{c^{\frac{3}{2}} f^{\frac{3}{2}}}{3!} + L^4 \cdot (1-d^6) \cdot \frac{c^2 f^2}{4!} + \cdots \right\}$$

where $\mu$ is a permeability, L is a distance between the at least one transmitter transmitter and the main receiver, f is a frequency, d is a ratio of a smaller length to a larger length of the three coil array, and $c = -2\pi i \mu \sigma$, where $\mu$ is a permeability and $\sigma$ is a conductivity.

12. The apparatus of claim 8 further comprising a conveyance device configured to convey the resistivity instrument into the borehole, the conveyance device selected from: (i) a wireline, (ii) a slickline, and (iii) a drilling tubular.

13. The apparatus of claim 8 wherein a processor is further configured to perform at least one of (i) displaying the formation resistivity, (ii) storing the formation resistivity on a suitable medium, (iii) interpreting a petrophysical property of the formation, (iv) performing a geological correlation, (v) determining a hydrocarbon-water contact, (vi) determining an invasion profile, (vii) identifying a fracture, (viii) estimating movable hydrocarbons, (ix) controlling a directional drilling of the borehole, and (x) drilling an additional well.

14. The method of claim 8 wherein the processor is further configured to select values of the plurality of frequencies to increase linear independence of columns of a Taylor series matrix.

15. A computer readable medium product having stored thereon instructions that when read by a processor cause the processor to execute a method, the method comprising:
applying a multifrequency focusing (MFF) to signals induced in a receiver in a borehole in an earth formation at a plurality of frequencies by forming a weighted summation thereof to give a focused signal, the induced signals being indicative of a resistivity and a permittivity of the formation;
selecting coefficients of the MFF to substantially eliminate an effect of the permittivity on the focused signal; and
determining from the focused signal the formation resistivity.

16. The computer-readable medium of claim 15 further comprising at least one of: (i) a read-only memory (ROM), (ii) a programmable read-only memory (PROM), (iii) an electrically programmable read-only memory (EPROM), (iv) an electrically alterable read-only memory (EAROM), (v) an electrically erasable and programmable read-only memory (EEPROM), (vi) a flash memory, (vii) an optical disk, (viii) a hard drive, and (ix) a non-volatile read-write memory (NOVRAM).

* * * * *